(12) United States Patent
Kato et al.

(10) Patent No.: US 8,159,582 B2
(45) Date of Patent: Apr. 17, 2012

(54) SOLID-STATE IMAGING APPARATUS AND METHOD OF DRIVING THE SAME

(75) Inventors: Satoshi Kato, Kawasaki (JP); Tetsunobu Kochi, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 12/561,604

(22) Filed: Sep. 17, 2009

(65) Prior Publication Data

US 2010/0073537 A1 Mar. 25, 2010

(30) Foreign Application Priority Data

Sep. 22, 2008 (JP) ................................ 2008-243200

(51) Int. Cl.
*H04N 3/14* (2006.01)
*H04N 5/335* (2011.01)

(52) U.S. Cl. ......... 348/301; 348/294; 348/300; 348/302

(58) Field of Classification Search .................. 348/294, 348/300, 301
See application file for complete search history.

(56) References Cited

U.S. PATENT DOCUMENTS

| | | | | |
|---|---|---|---|---|
| 6,456,326 | B2 | 9/2002 | Fossum et al. | 348/308 |
| 7,002,628 | B1 * | 2/2006 | Panicacci | 348/307 |
| 7,135,668 | B2 | 11/2006 | Kochi et al. | 250/214 R |
| 7,221,397 | B1 | 5/2007 | Kochi | 348/310 |
| 7,423,790 | B2 | 9/2008 | Kochi et al. | 358/513 |
| 2003/0071195 | A1 | 4/2003 | Misek | 250/208.2 |
| 2005/0206752 | A1 * | 9/2005 | Lim | 348/241 |
| 2008/0036890 | A1 | 2/2008 | Yamashita et al. | 348/308 |
| 2008/0079825 | A1 * | 4/2008 | Matsuda | 348/241 |
| 2009/0141157 | A1 | 6/2009 | Kobayashi et al. | 348/308 |
| 2009/0200449 | A1 | 8/2009 | Iwata et al. | 250/206 |
| 2011/0102654 | A1 * | 5/2011 | Hiyama et al. | 348/300 |

FOREIGN PATENT DOCUMENTS

JP 2003-228457 A 8/2003

* cited by examiner

*Primary Examiner* — Anthony J Daniels
(74) *Attorney, Agent, or Firm* — Fitzpatrick, Cella, Harper & Scinto

(57) ABSTRACT

A solid-state imaging apparatus has a plurality of pixels arranged linearly along columns of N, a plurality of clamping capacitors each arranged corresponding to each column of the pixels, for accumulating the charge amplified by an amplifying unit in the pixel, and a common node arranged corresponding to each set including the clamping capacitors of L (L is equal to or larger than 2, and a divisor of N), and connectable to each set including the clamping capacitors of L. A plurality of pixel selection switches are connected between the clamping capacitor and the common node, and a clamping unit clamps the common nodes to a reference potential. In addition, a sampling and holding circuit connects to the common nodes through the clamping unit, and samples and holds a charge corresponding to a charge of the common node.

7 Claims, 8 Drawing Sheets

SOLID-STATE IMAGING APPARATUS AND METHOD OF DRIVING THE SAME

BACKGROUND OF THE INVENTION

1. Field of the Invention

The present invention relates to a solid-state imaging apparatus for use in a facsimile, a scanner, a video camera, and a digital still camera, and a method of driving the same.

2. Description of the Related Art

In recent years, CMOS type solid-state imaging apparatuses have been widespread for a facsimile, a scanner and a digital camera. One of the reasons for this lies in that a high S/N (signal to noise ratio) can be realized. In CMOS type solid imaging apparatuses, the art is known, which enhances the S/N by providing an amplifier directly behind the signal line for reading out a signal from a pixel, and by amplifying the signal when the circuit noise is still small.

While the spatial resolution of the linear CMOS solid-state imaging apparatus has been enhanced over the years, cost reduction has been required. As the effective means for cost reduction, in Patent Document 1, an amplifier which is usually arranged corresponding to each column is shared by a plurality of columns to reduce the number of circuit elements, and thereby, the chip area is reduced.

In Patent Document 1, by using the first sampling capacitor (hereinafter, a clamping capacitor), CDS (Correlated Double Sampling) processing using a reset signal and a light signal of a pixel is performed. At this time, the reset signal which is read out after reading the light signal is used for CDS processing. By the CDS processing, the fixed pattern noise which is caused by a production variation that occurs in the pixel can be removed.

(Patent Document 1) Japanese Patent Application Laid-Open No. 2003-228457

However, the solid-state imaging apparatus which applies the aforementioned cost reduction technique has the problem shown as follows.

Random kTC noise (heat noise) by the rest transistor is superimposed on the reset signal of a pixel. However, with the operation described in Patent Document 1, the light signal and the reset signal are not correlated, and therefore, the kTC noise cannot be removed by the CDS processing.

In the circuit configuration of Patent Document 1, by changing the number of column selection switches which are simultaneously turned on, when reading out the pixel signal, addition of the light signal and change of the resolution are enabled. For example, by simultaneously turning on the two column selection switches connected to one amplifier, two pixels are simultaneously read out, and low-resolution imaging can be performed. However, the kTC noise included in the reset signals of two pixels is added simultaneously with addition of the light signals of the two pixels. Therefore, at the time of a low resolution mode, noise increases as compared with a normal resolution time.

The present invention is made in view of the above described problem, and has an object to provide a solid-state imaging apparatus which enables readout of a signal with low noise at the time of a low resolution mode while keeping cost low, and a method of driving the same.

SUMMARY OF THE INVENTION

A solid-state imaging apparatus of the present invention is a solid-state imaging apparatus comprising a plurality of pixels arranged linearly along columns of N, wherein N is a positive integer, wherein each of the pixels includes a photoelectric conversion element for converting a light into a charge and accumulating the charge, a reset unit for resetting the charge of the photoelectric conversion element and an amplifying unit for amplifying the charge of the photoelectric conversion element, a plurality of clamping capacitors each arranged corresponding to each column of the pixels, for accumulating the charge amplified by the amplifying unit, a plurality of common nodes arranged each corresponding to each set including the clamping capacitors of L, wherein L is a positive integer equal to or larger than 2, and a divisor of N, and each connectable to each set including the clamping capacitors of L, a plurality of pixel selection switches each connected between the clamping capacitor and the common node, a clamping unit for clamping the common nodes to a reference potential, and a sampling and holding circuit connected to the common nodes through the clamping unit, and sampling and holding a charge corresponding to a charge of the common node, wherein the solid-state imaging apparatus performs a first operation mode, such that the clamping capacitor accumulates, as a light signal, the charge of the photoelectric conversion element accumulated under a condition without the reset by the reset unit, thereafter the clamping capacitor accumulates, as a reset signal, the charge of the photoelectric conversion element accumulated under a condition with the reset by the reset unit, and further thereafter, by turning on only one of the plurality of pixel selection switches connected to the same common node, the sampling and holding circuit samples and holds a difference signal between the light signal and the reset signal, and the solid-state imaging apparatus performs a second operation mode, such that the clamping capacitor accumulates, as the reset signal, the charge of the photoelectric conversion element accumulated under a condition with the reset by the reset unit, thereafter the clamping capacitor accumulates, as the light signal, the charge of the photoelectric conversion element accumulated under a condition without the reset by the reset unit, and further thereafter, by turning on all of the plurality of pixel selection switches connected to the same common node, the sampling and holding circuit samples and holds a difference signal between the reset signal and the light signal.

Further features of the present invention will become apparent from the following description of exemplary embodiments with reference to the attached drawings.

The accompanying drawings, which are incorporated in and constitute a part of the specification, illustrate embodiments of the invention and, together with the description, serve to explain the principles of the invention.

DESCRIPTION OF THE EMBODIMENTS

Next, embodiments of the present invention will be described with reference to the drawings.

First Embodiment

Figure 1:
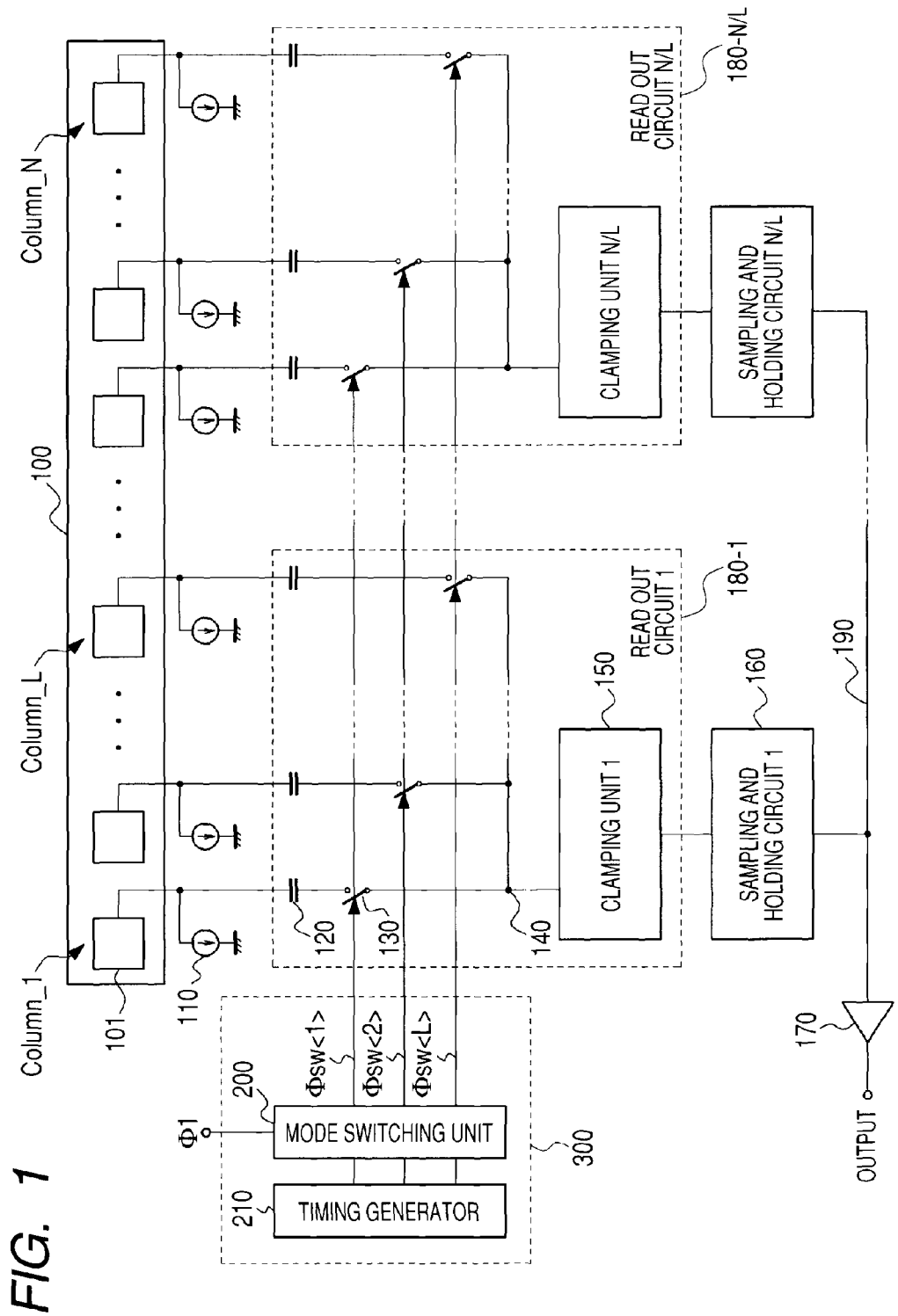
FIG. 1 is a system block diagram of a sold-state imaging apparatus according to a first embodiment of the present invention.

FIG. 1 is a system block diagram of a solid-state imaging apparatus according to a first embodiment of the present invention. In a sensor array 100, a plurality of pixels 101 are arranged linearly along columns of N (namely, Column_1, Column_2, . . . Column_N). A current source 110 is provided for each of the pixels for applying a bias to an output buffer of the pixel 101. The output from the pixel 101 is connected to a reading out circuit 180 by the unit of pixels 101 of L (L is a divisor of N). The reading out circuit 180 is arranged corresponding to each set of pixels 101 of L. The present embodiment is a linear type sensor in which a plurality of pixels 101 are arranged linearly along one or several rows.

The reading out circuit 180 includes clamping capacitors 120 of L each arranged corresponding to each of the pixels 101, and the output from each of the pixels 101 and a first electrode of the clamping capacitor 120 are connected to each other. Pixel selection switches 130 of L each arranged corresponding to each of the pixels 101 are each connected to a second electrode of the clamping capacitor 120. The pixel selection switches 130 of L are controlled by control signals of L (namely, Fsw<1>, Fsw<2>, . . . Fsw<L>) each corresponding to each of the pixels 101. The second electrodes of the clamping capacitors 120 of L are connected to a common node 140 through the column selection switches 130. The common node 140 is connected to a clamping unit 150 which has the function of clamping the common node 140 to a specific reference potential.

The common node 140 is connected to a sampling and holding circuit 160 through the clamping unit 150. The sampling and holding circuit 160 holds a signal component corresponding to a difference between a reset signal and a light signal of the pixel 101 which is output in the reading out circuit 180. The signal component held by the sampling and holding circuit 160 is input into an output amplifier 170 through a common output line 190, and is output by the output amplifier 170.

A drive control circuit 300 includes a mode switching unit 200 and a timing generator 210. The mode switching unit 200 selects a control pulse in a first operation mode or a second operation mode from a signal group output from the timing generator 210 based on a mode control signal F1, and outputs the control pulse.

Figure 6:
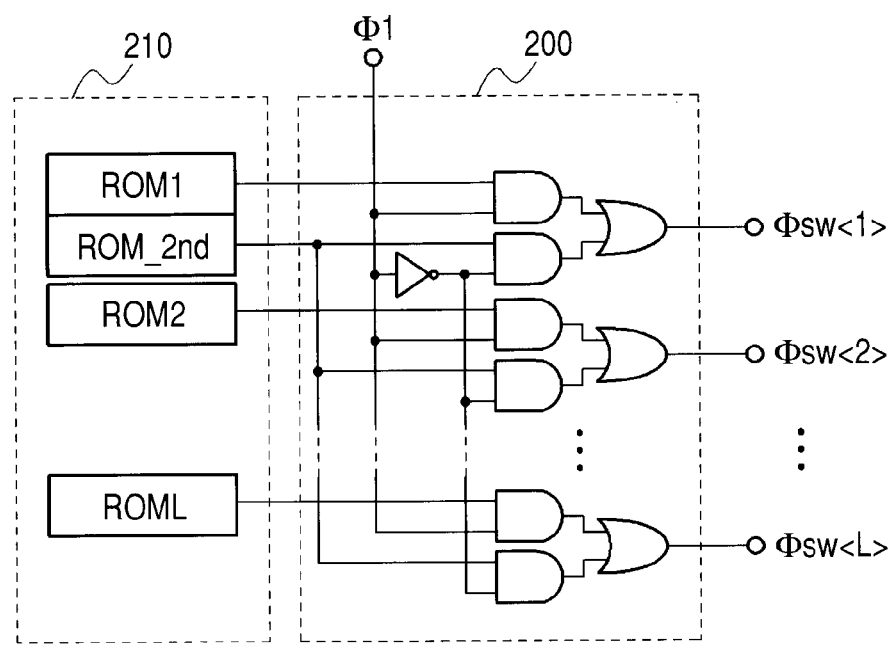
FIG. 6 is a circuit configuration diagram of a drive control circuit.

Here, one example of the mode switching unit 200 of FIG. 1 is illustrated in FIG. 6. The timing generator 210 is provided with ROM circuits (namely, ROM 1, ROM 2, . . . ROML, ROM_$2^{nd}$) storing the control signals of the pixel selection switches 130. At the time of the first operation mode, the mode control signal F1 switches to high level. Thereupon, by a multiplexer provided at the mode switching unit 200, the signals from the ROM 1, ROM 2, . . . ROM L are output as the control signals Fsw<1>, Fsw<2>, . . . Fsw<L> of the pixel selection switch 130. At the time of the second operation mode, the mode control signal F1 switches to low level, and the signals from the ROM_2nd is output as the control signals Fsw<1>, Fsw<2>, . . . Fsw<L> of the pixel selection switch 130. Thus, the control pulse which is input into the reading out circuit 180 is switched for each operation mode by the mode switching unit 200.

The configuration of the mode switching unit 200 in the present embodiment is not limited to that of FIG. 6. This also applies to the following embodiments.

Figure 2:
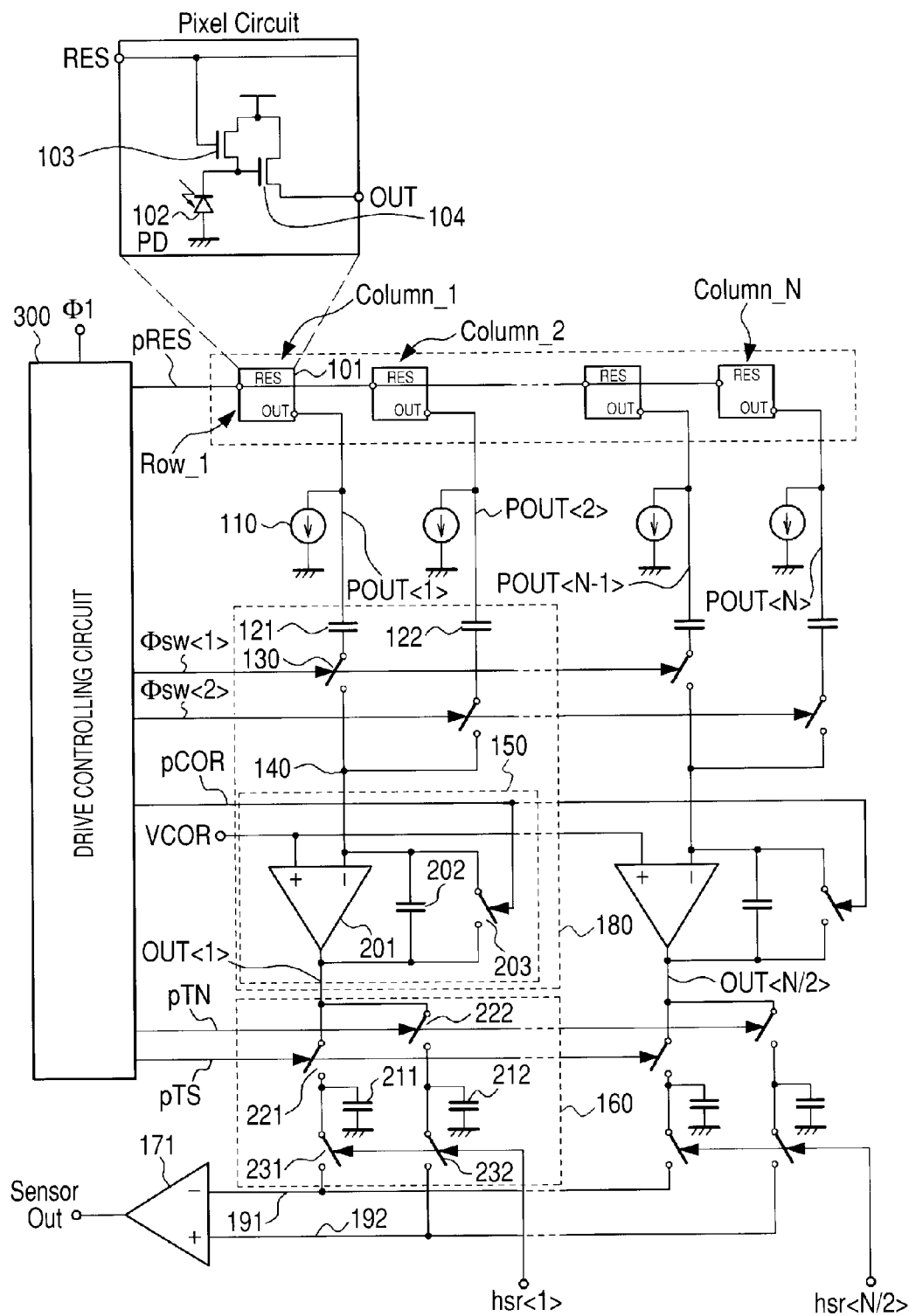
FIG. 2 is a schematic configuration diagram of the solid-state imaging apparatus according to the first embodiment of the present invention.

FIG. 2 illustrates a schematic configuration diagram of the solid-state imaging apparatus, which illustrates the system block diagram of FIG. 1 in more detail. FIG. 2 illustrates the case where the number L of shared pixels is two. Further, each switch in FIG. 2 is turned on when the control signal is at high level, and is turned off when the control signal is at low level. This also applies to the following embodiments.

In FIG. 2, the pixel 101 is configured by a photodiode (photoelectric conversion element) 102, a reset transistor 103, and an input transistor (amplifying unit) 104 as a source follower amplifier. The photodiode 102 converts light into an electric charge and accumulates the charge.

The clamping unit 150 is configured by an operational amplifier 201, a feedback capacitor 202 and a reset switch 203 to configure a switched capacitor amplifier with the clamping capacitors 121 and 122 as input capacitors. The clamping unit 150 has an amplifying mode and a unity gain mode. When the reset switch 203 is off, the clamping unit 150 is in the amplifying mode, so that a signal is amplified according to the ratio of the clamping capacitors 121 and 122 and the feedback capacitor 202. Further, by turning on the reset switch 203, the clamping unit 150 is in the unity gain mode, so that reset is performed at a reference potential VC0R which is applied to a positive input terminal if the offset of the operational amplifier 201 is ignored.

The sampling and holding circuit 160 includes holding capacitors 211 (hereinafter, called Cts) and 212 (hereinafter, called Ctn) each for holding the signal components of the pixels amplified by the reading out circuit 180 and the noise component which occurs in the reading out circuit 180. The sampling and holding circuit 160 includes sampling and holding control switches 221 and 222 which control sampling to the Cts 211 and Cts 212, and horizontal scanning switches 231 and 232 which controls readout to common output lines 191 and 192. The sampling and holding control switches 221 and 222 are controlled by control signals pTS and pTN of the drive control circuit 300, and the horizontal scanning switches 231 and 232 are controlled by horizontal shift register signals hsr<1>, . . . hsr<N/2>. A differential amplifier 171 outputs a difference of the signals of the common output lines 191 and 192.

Figure 3:
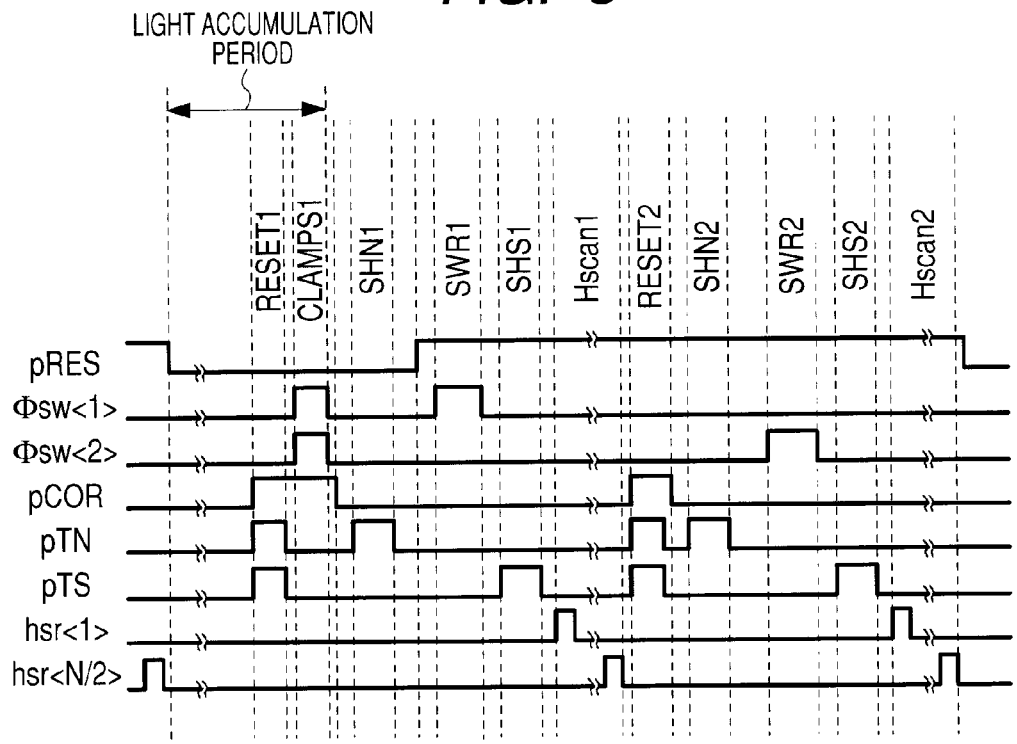
FIG. 3 is a timing chart illustrating a first operation mode in the solid-state imaging apparatus according to the first embodiment of the present invention.

Here, a method of driving the solid-state imaging apparatus in the first operation mode for performing imaging with a normal resolution will be described by using a timing chart of FIG. 3. In a period RESET 1, the signals pc0R, pTN and pTS of the drive control circuit 300 are switched to high level, and the clamping unit 150 is brought into a unity gain mode to reset the clamping units 150, the Cts 211 and Ctn 212. Thereafter, in a period CLAMPS1, the control signals Fsw<1> and Fsw<2> switch to high level, whereby the clamping capacitors 121 and 122 and the common node 140 are connected, and the reference potential VC0R is applied to the second electrodes of the clamping capacitors 121 and 122. At this time, the light signal of each of the pixels is applied to the first electrodes of the clamping capacitors 121 and 122. Therefore, the electric charge corresponding to the differential voltage of the light signals of the pixels of each column and VC0R is stored in the clamping capacitors 121 and 122.

After a signal pC0R is switched to low level, and the clamping unit 150 is brought into an amplifying mode, a signal pTN is switched to high level in a period SHN1, and thereby, the noise signal of the reading out circuit 180 is held in the Ctn 212. Next, a reset signal pRES of the drive control circuit 300 is switched to high level, the reset transistor 103 is turned on, and the photodiode 102 is reset. In a period SWR1, the signal Fsw<1> is switched to high level, and the reset signal of each of the pixels to which the signal Fsw<1> is connected is read out to the clamping capacitor 121, whereby the clamping unit 150 performs CDS processing and amplifies the difference signal of the light signal and the reset signal which are obtained from the CDS processing. In a period SHS1, by switching the signal pTS to high level, the amplified signal component is held by the Cts 211. In a period Hscan1, the signals hsr<1> to hsr<N/2> are sequentially switched to high-level pulses, whereby the difference of the signals held by the Cts 211 and the Ctn 212 is output to an outside of the sensor through the differential amplifier 171.

In a period RESET2, the signals pC0R, pTN and pTS are switched to high level, and the clamping unit 150 and the sampling and holding circuit 160 are reset. In a period SHN2, by switching the signal pTN to high level, the noise signal of the reading out circuit 180 is held by the Ctn 212. Thereafter, in a period SWR2, by switching the control signal Fsw<2> to high level, the reset signal of each of the pixels to which the control signal Fsw<2> is connected is read out to the clamping capacitor 122, and the CDS processing and amplification of the signal are performed. In a period SHS2, by switching the signal pTS to high level, the amplified signal is held by the Cts 211. In a period Hscan 2, by sequentially switching the signals hsr<1> to hsr<N/2> high-level pulses, the signal components held by the Cts 211 and Ctn 212 are output to the outside of the sensor through the differential amplifier 171. The above is a series of operations relating to reading out of the signal corresponding to one row in the first operation mode. The accumulation period of the light signal is until the end of the period CLAMPS1 after the reset signal pRES switches to low level.

Figure 4:
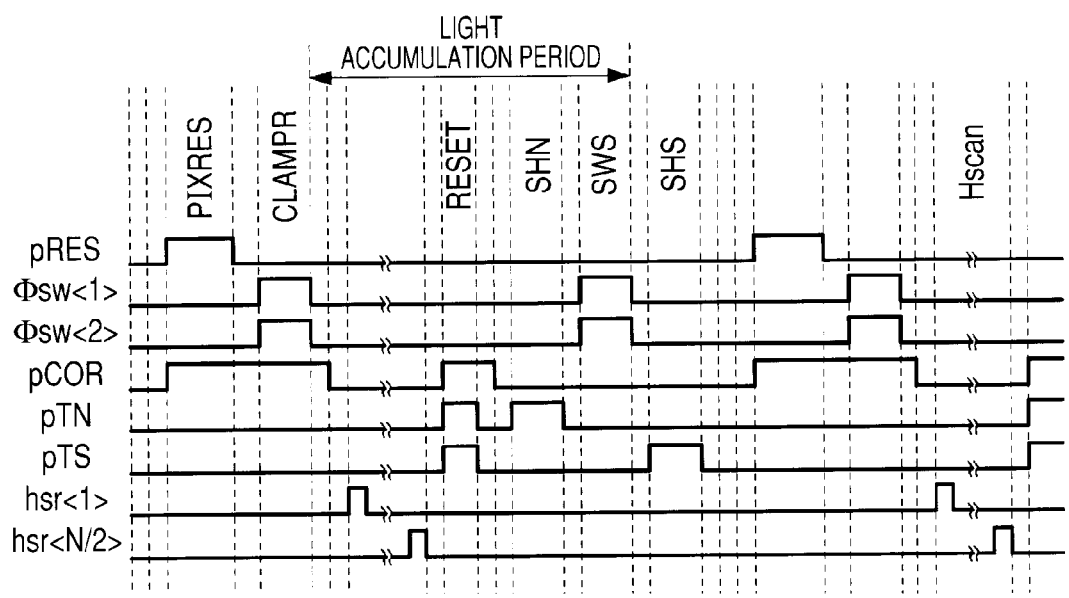
FIG. 4 is a timing chart illustrating a second operation mode in the solid-state imaging apparatus according to the first embodiment of the present invention.

Subsequently, a method of driving the solid-state imaging apparatus in the second operation mode for performing low-resolution imaging will be described by using a timing chart of FIG. 4. In a period PIXRES, signals pRES and pC0R are switched to high level, and the pixel 101 is reset. Thereafter, in a period CLAMPR, the control signals Fsw<1> and Fsw<2> are switched to high level. Thereby, the reset signal of each of the pixels 101 is read out to the clamping capacitors 121 and 122, and the electric charge corresponding to the differential voltage of the reference potential VC0R and the reset signal is held in the clamping capacitors 121 and 122. Thereafter, until a period RESET, the signals hsr<1> to hsr<N/2> are sequentially switched to high-level pulses, whereby the signals of the previous frames are read out to the outside of the chip, and light accumulation is performed by using the period.

In the period RESET, by switching the signals pC0R, pTN and pTS to high level, the clamping unit 150 and the sampling and holding circuit 160 are reset. Thereafter, in a period SHN, by switching the signal pTN to high level, the noise signal of the reading out circuit 180 is held by the Ctn 212. In a period SWS, by switching the control signals Fsw<1> and Fsw<2> to high level, the light signal of each of the pixels 101 is read out. At this time, CDS processing and amplification of the signal which are performed in a different timing for each of the pixels 101 in the first operation mode are simultaneously performed for all the pixels by simultaneously switching the control signals Fsw<1> and Fsw<2> to high level in the period SWS in the second operation mode. The clamping unit 150 performs CDS processing and amplifies the difference signal between the reset signal and the light signal which are obtained from the CDS processing.

In a period SHS, by switching the signal pTS to high level, the amplified signal is held by the Cts 211. Thereafter, the same processing as in the periods PIXRES and CLAMPR is performed. Thereafter, in a period Hscan, the signals hsr<1> to hsr<N/2> are sequentially switched to high-level pulses, whereby the signal components held in the Cts 211 and Ctn 212 are output to the outside of the sensor through the differential amplifier 171. The above is a series of operations relating to reading out of the signals corresponding to two rows in the second operation mode. The accumulation period of the light signals is until the end of the period SWS from the end of the period CLAMPR. By adding the signals of the adjacent pixels 101 of L, a low resolution is realized.

Here, the reset signal and the light signal of the first pixel are set as VR1 and VS1, and the reset signal and the light signal of the second pixel are set as VR2 and VS2. Further, the capacitance values of the clamping capacitors 121 and 122 are set as Cc respectively, and the capacitance value of the feedback capacitor 202 is set as Cf. At this time, an output voltage VOUT_1 which appears in an output OUT<1> of the reading out circuit 180 as a result of the operation of the period SWS is expressed by formula (I) shown as follows.

$$VOUT\_1=(Cc/Cf)\times[(VR1-VS1)+(VR2-VS2)]+VC0R \quad (1)$$

At this time, for performing readout in the aforementioned timing, there is a correlation between VR1 and VS1, and between VR2 and VS2. Therefore, by the CDS processing expressed by (VR1-VS1) and (VR2-VS2), the kTC noise is removed, and increase in noise at the time of low-resolution imaging by an adding operation can be suppressed.

As described above, in the present embodiment, by using the reset signal which is correlated with the light signal for CDS processing at the time of low-resolution imaging, read-out with low noise is enabled without impairing cost reduction.

The pixel 101 in the present embodiment is configured by the photodiode 102, the reset transistor 103 and the input transistor 104 as illustrated in FIG. 2. However the present embodiment is not limited to this, and a selecting transistor may be included. For example, in a sensor or the like which handles a plurality of colors, a row selecting transistor is sometimes provided at the source terminal of the input transistor 104, but providing the row selecting transistor does not impair the correlation of the reset level and the light signal of the second operation mode of the present embodiment. Therefore, the effect shown in the present embodiment can be obtained irrespective of presence or absence of the row selecting transistor. This also applies to the following embodiments.

Figure 5:
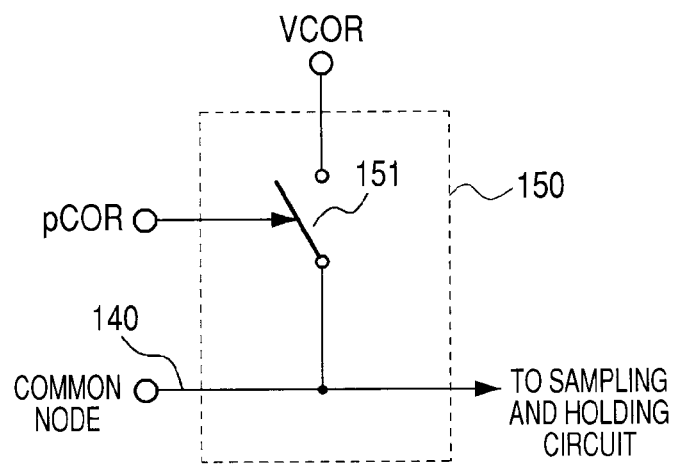
FIG. 5 is a circuit configuration diagram of a clamping unit in the solid-state imaging apparatus according to the first embodiment of the present invention.

Further, in the present embodiment, the clamping unit 150 is configured by an amplifier as illustrated in FIG. 2, but the present embodiment is not limited to this. For example, even when the clamping unit 150 is replaced with the circuit which is configured by only a clamping switch 151 which is controlled by the control signal pC0R as illustrated in FIG. 5, the effect in the present embodiment can be obtained.

As described above, the solid-state imaging apparatus of the present embodiment has a plurality of pixels 101 arranged linearly in columns of N. The pixel 101 includes the photoelectric conversion element (FD) 102 which converts light into an electric charge and accumulates the charge, the reset unit (reset transistor) 103 which resets the electric charge of the photoelectric conversion element 102, and the amplifying unit (input transistor) 104 which amplifies the charge of the photoelectric conversion element 102.

A plurality of clamping capacitors 121 and 122 are provided correspondingly to each of the pixels 101 of each of the columns, and accumulate the electric charge amplified by the amplifying unit 104. The common nodes 140 are each provided correspondingly to each set of the clamping capacitors 121 and 122 of L (L is equal to or larger than 2 and a divisor of N), and each of the common nodes can be connected to the clamping capacitors 121 and 122 of L. A plurality of pixel selection switches 130 are connected to between the clamping capacitors 121 and 122 and the common nodes 140. The clamping unit 150 can clamp the common node 140 to the reference potential VC0R. The sampling and holding circuit 160 is connected to the common node 140 via the clamping unit 150, and samples and holds the electric charge corresponding to the electric charge of the common node 140.

In the first operation mode (FIG. 3), the electric charge of the photoelectric conversion element 102 without the reset by the reset unit 103 is accumulated in the clamping capacitors 121 and 122 as the light signal. Next, the electric charge of the photoelectric conversion element 102 with the reset by the reset unit 103 is accumulated in the clamping capacitors 121 and 122 as the reset signal. Next, in the period SWR1, only one pixel selection switch out of a plurality of pixel selection switches 130 connected to the same common node 140 is turned on, and in the period SHS1, the difference signal of the light signal and the reset signal is sampled and held by the sampling and holding circuit 160.

In the second operation mode (FIG. 4), the electric charge of the photoelectric conversion element 102 with the reset by the reset unit 103 is accumulated in the clamping capacitors 121 and 122 as the reset signal. Next, the electric charge of the photoelectric conversion element 102 without the reset by the reset unit 103 is accumulated in the clamping capacitors 121 and 122 as the light signal. Next, in the period SWS, all the plurality of pixel selection switches 130 connected to the same common node 140 are turned on, and in the period SHS, the difference signal of the reset signal and the light signal is sampled and held by the sampling and holding circuit 160.

Second Embodiment

Figure 7:
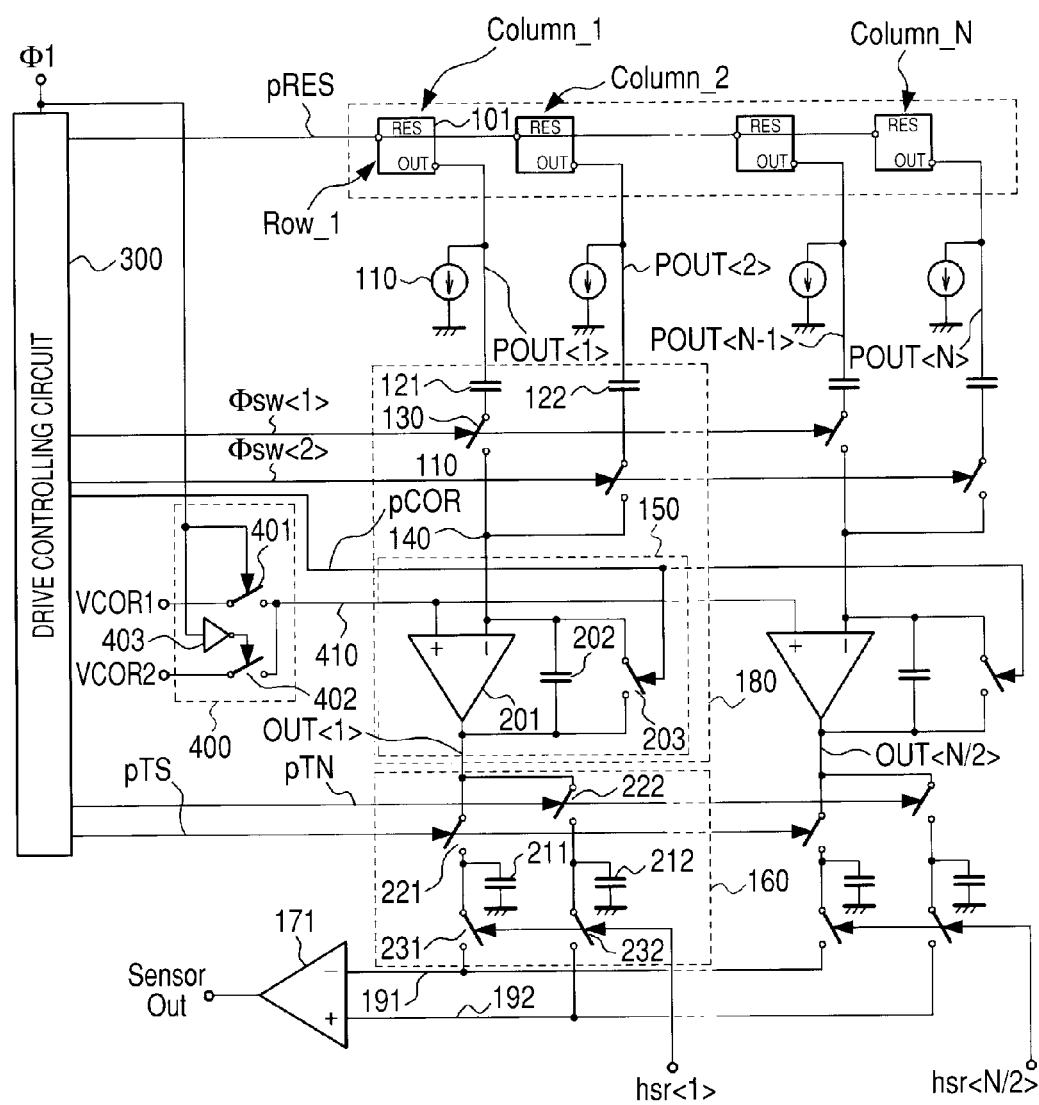
FIG. 7 is a schematic configuration diagram of a sold-state imaging apparatus according to a second embodiment of the present invention.

FIG. 7 is a diagram illustrating a solid-state imaging apparatus according to a second embodiment of the present invention. Here, only the difference between the present embodiment and the first embodiment will be described.

As shown in the first embodiment of the present invention, in the first operation mode, a reset signal is subtracted from a light signal, whereas in the second operation mode, a light signal is subtracted from a reset signal. More specifically, the polarity of the signal component which is obtained by CDS processing becomes opposite in the first operation mode from the second operation mode. As a result, the output of the reading out circuit 180 has signal amplitudes in both positive and negative directions with respect to the reference potential depending on the operation modes, and the output operation range of the operational amplifier 201 and the input and output operation range of the circuit at the subsequent stage are likely to be squeezed.

A reference potential switching unit 400 controls a voltage value of a reference potential node 410 which supplies a reference potential to each of the clamping units 150, and is configured by reference potential changeover switches 401 and 402, and an inverter 403 for generating an inverted signal of the mode control signal F1. In the present embodiment, at the time of the aforementioned first operation mode, the mode control signal F1 switches to high level, the reference potential changeover switch 401 is turned on, and a first reference potential VC0R1 is supplied to the node 410. The node 410 is connected to a positive input terminal of the operational amplifier 201. Further, at the time of the aforementioned second operation mode, F1 switches to low level, the reference potential changeover switch 402 is turned on, and supplies a second reference potential VC0R2 to the node 410. In the present embodiment, by changing the reference potential which is applied to each of the clamping units 150 in each of the operation modes, a signal can be handled in a proper operation range without influencing the operational amplifier 201 and the circuit at the subsequent stage.

As described above, the reference potential switching unit 400 switches the reference potential to the first reference potential VC0R1 in the first operation mode, and switches the reference potential to the second reference potential VC0R2 in the second operation mode.

The configuration illustrated in FIG. 7 is applied to the reference potential switching unit 400 in the present embodiment, but the present embodiment is not limited to this.

Third Embodiment

Figure 8:
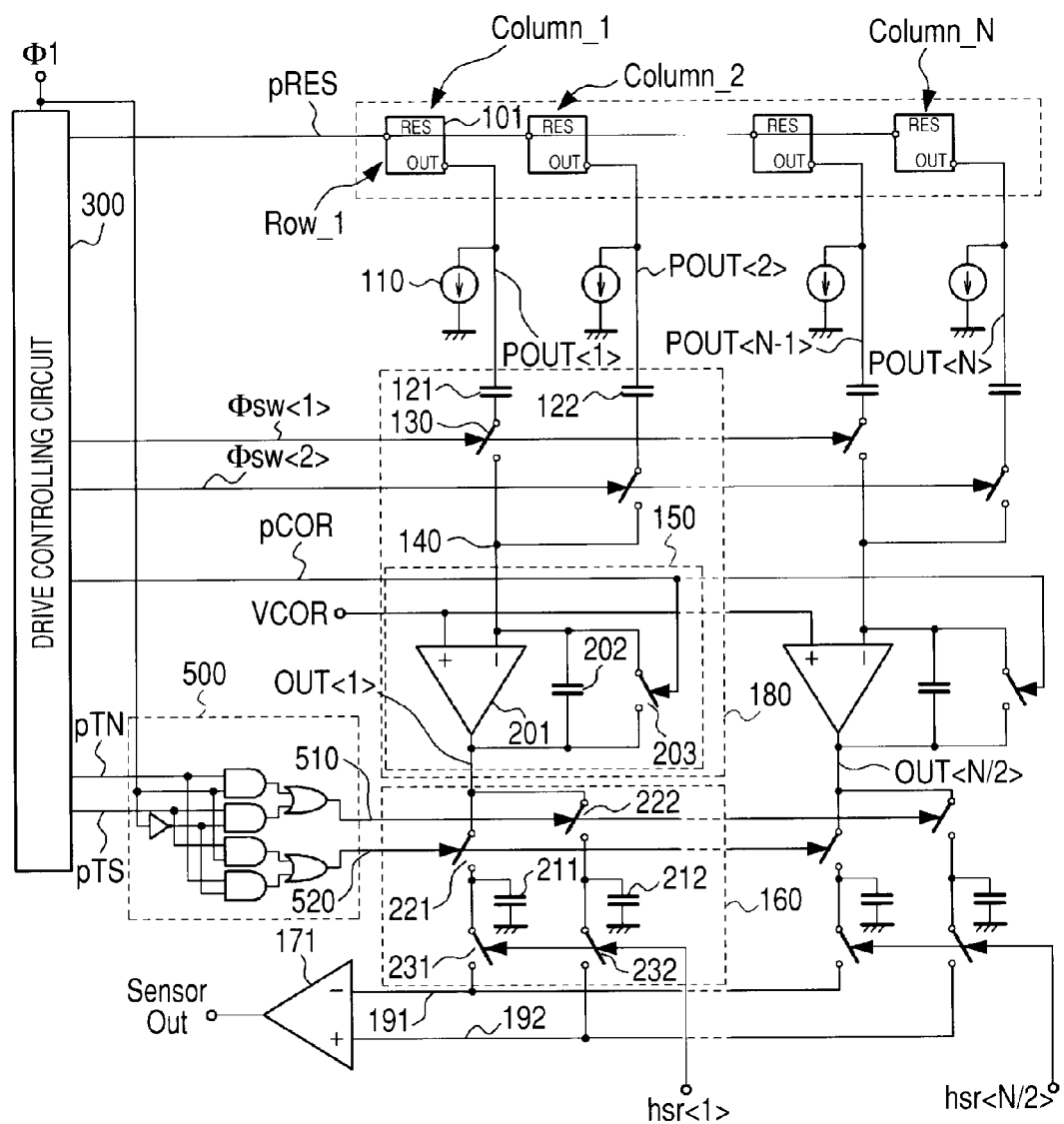
FIG. 8 is a schematic configuration diagram of a solid-state imaging apparatus according to a third embodiment of the present invention.

FIG. 8 is a diagram illustrating a solid-state imaging apparatus according to a third embodiment of the present invention. Here, only the difference between the present embodiment and the first embodiment will be described.

A sampling and holding capacitor switching unit 500 switches the nodes to which the signals pTN and pTS are output according to the first and the second operation modes. At the time of the first operation mode, the mode control signal F1 switches to high level. Thereupon, the switching unit 500 outputs the signal pTS to a sampling and holding control signal line 510 which controls sampling to the Cts 211, and outputs the signal pTN to a sampling and holding control signal line 520 which controls sampling to the Ctn 212. The signal line 510 is a control signal line for the switch 222, whereas the signal line 520 is a control signal line for the switch 221. At the time of the second operation mode, the mode control signal F1 switches to low level, the switching unit 500 outputs the signal pTS to the sampling and holding control signal line 520, and outputs the signal pTN to the sampling and holding control signal line 510.

As a result, in the first operation mode, a light signal is held by the Cts 211, and a reset signal is held by the Ctn 212. In the second operation mode, a light signal is held by the Ctn 212, and a reset signal is held by the Cts 211. As described in the second embodiment, the polarity of the signal component which is obtained as a result of CDS processing becomes opposite from each other in the first operation mode and the second operation mode. With this, when the capacitors with which the light signal and the reset signal are held are the same in the first and the second operation modes, the polarity of the difference of the signal held by the Cts 211 and the signal held by the Ctn 212 becomes opposite. In the present embodiment, by switching the capacitors which hold the light signal and the reset signal output from the reading out circuit 180 according to the operation modes, the signals can be handled in a proper operation range without influencing the circuit at the subsequent stage.

As described above, the sampling and holding circuit 160 has the first sampling and holding capacitor 211 and the second sampling and holding capacitor 212. The sampling and holding capacitor switching unit 500 causes the first sampling and holding capacitor 211 to accumulate the difference signal of the light signal and the reset signal in the first operation mode, and causes the second sampling and holding capacitor 212 to accumulate the noise signal. Further, the sampling and holding capacitor switching unit 500 causes the first sampling and holding capacitor 211 to accumulate a noise signal, and causes the second sampling and holding capacitor 212 to accumulate the difference signal of the reset signal and the light signal in the second operation mode.

Fourth Embodiment

Figure 9:
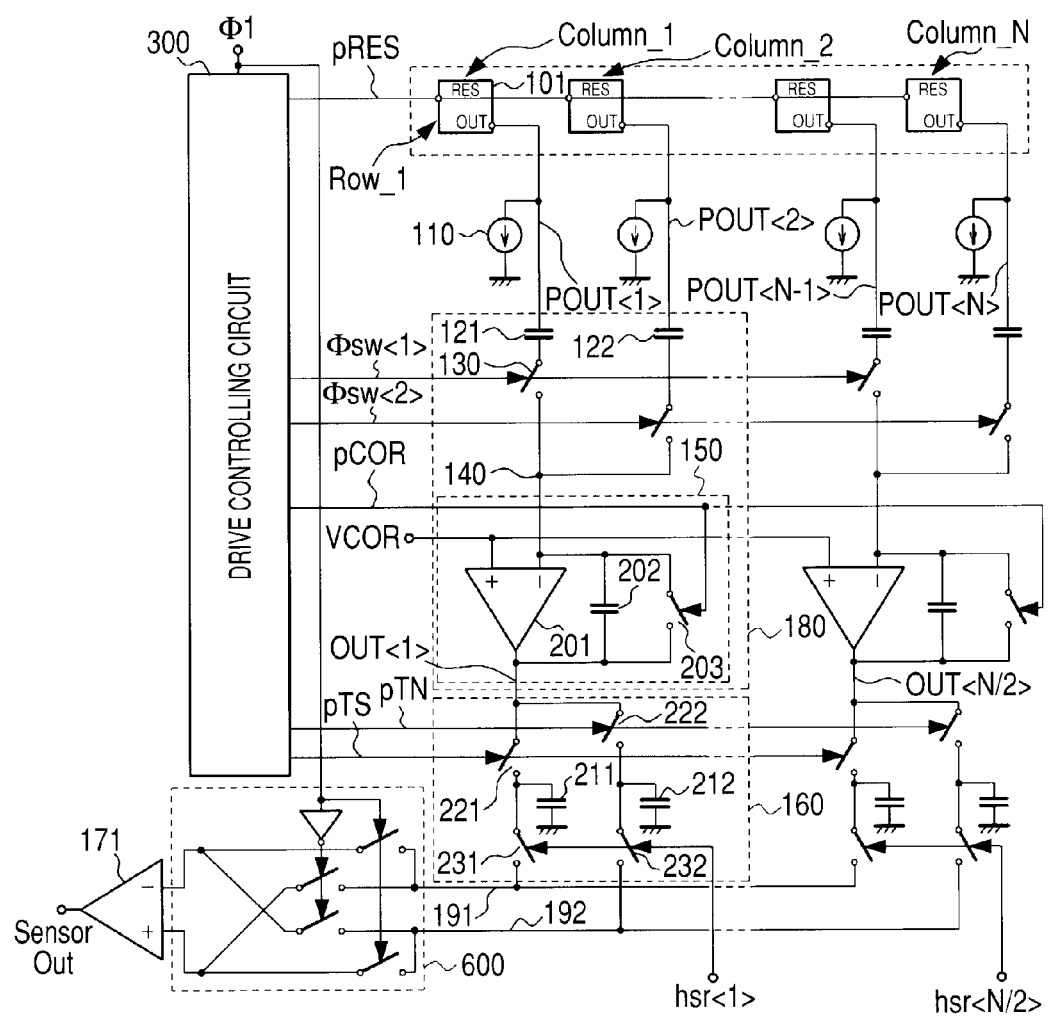
FIG. 9 is a schematic configuration diagram of a solid-state imaging apparatus according to a fourth embodiment of the present invention.

FIG. 9 is a diagram illustrating a solid-state imaging apparatus according to a fourth embodiment of the present invention. Here, only the difference between the present embodiment and the first embodiment will be described.

In FIG. 9, in the present embodiment, an input terminal switching unit 600 switches common output lines 191 and 192 which are connected to the input terminal of the differential amplifier 171 according to the first and the second operation modes. The common output lines 191 and 192 which are connected to the input of the differential amplifier 171 are switched according to the operation modes, and the polarities of the signal components which are input are caused to correspond to each other in the first operation mode and the second operation mode, whereby the differential amplifier 171 can be operated in a proper input output operation range.

For example, in the first operation mode, the mode control signal F1 switches to high level, the common output line 191 is connected to the negative input terminal of the differential amplifier 171, and the common output line 192 is connected to the positive input terminal of the differential amplifier 171. In the second operation mode, the mode control signal F1 switches to low level, the common output line 191 is connected to the positive input terminal of the differential amplifier 171, and the common output line 192 is connected to the negative input terminal of the differential amplifier 171.

As described above, the sampling and holding circuit 160 has the first sampling and holding capacitor 211 and the second sampling and holding capacitor 212. The first common output line 191 and the second common output line 192 are the common output lines for outputting the signals accumulated in the first sampling and holding capacitor 211 and the second sampling and holding capacitor 212 to an outside. The differential amplifier 171 has the first input terminal and the second input terminal. The input terminal switching unit 600 connects the first common output line 191 to the first input terminal of the differential amplifier 171 in the first operation mode, and connects the second common output line 192 to the second input terminal of the differential amplifier 171. Further, the input terminal switching unit 600 connects the first common output line 191 to the second input terminal of the differential amplifier 171 and connects the second common output line 192 to the first input terminal of the differential amplifier 171 in the second operation mode.

Fifth Embodiment

Figure 10:
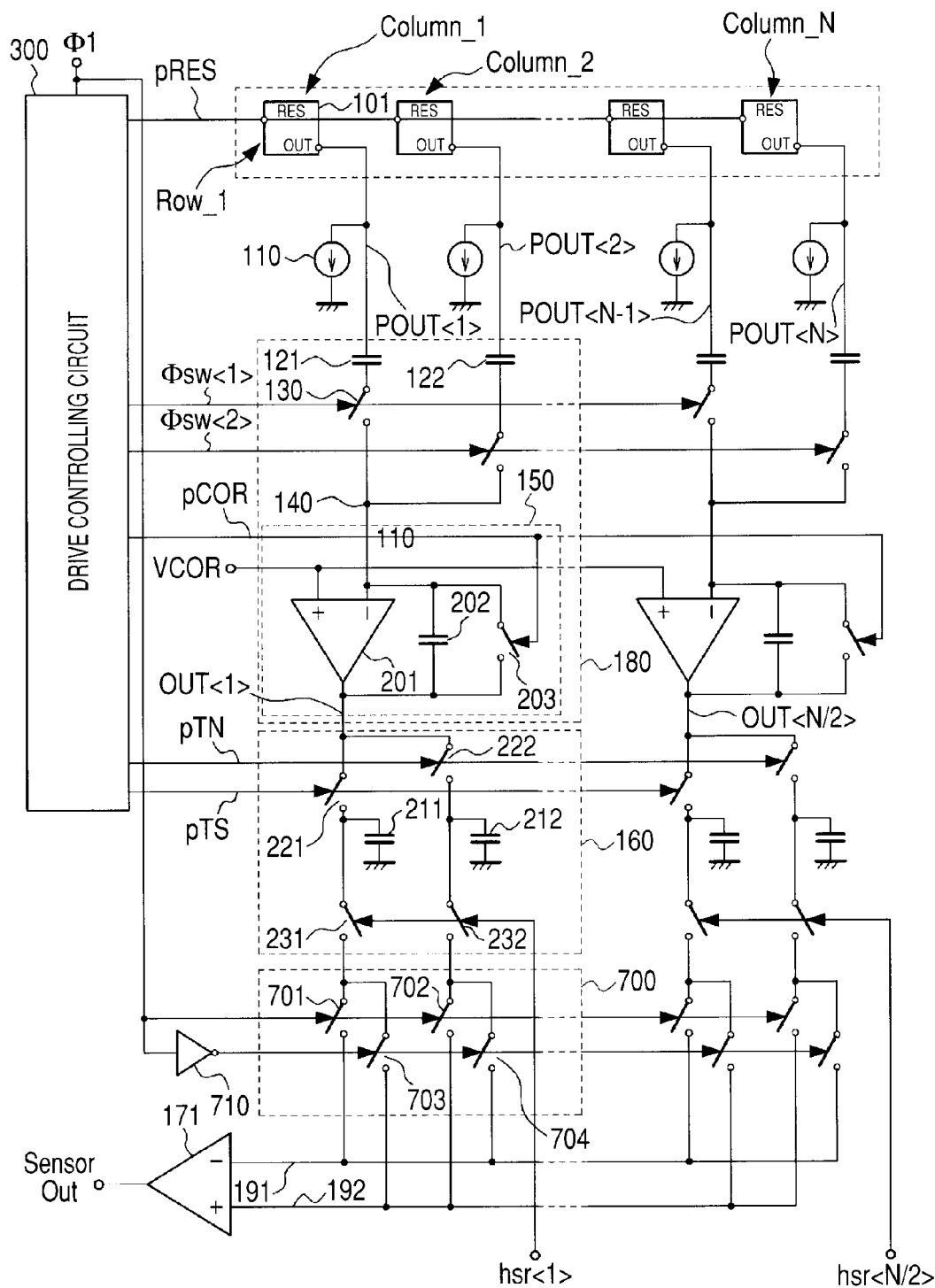
FIG. 10 is a schematic configuration diagram of a solid-state imaging apparatus according to a fifth embodiment of the present invention.

FIG. 10 is a diagram illustrating a solid-state imaging apparatus according to a fifth embodiment of the present invention. Here, only the difference between the present embodiment and the first embodiment will be described.

A common output line switching unit 700 is configured by common output line selection switches 701, 702, 703 and 704 which are controlled by the mode control signal F1 and the inverted signal of the mode control signal F1. The common output line switching unit 700 switches the common output lines 191 and 192 connected to the Cts 211 and Ctn 212 according to the first and the second operation modes. In the present embodiment, at the time of the first operation mode, the mode control signal F1 switches to high level, and the common output line selection switches 701 and 702 are turned on. Further, by the inverted signal of the F1, which is generated by an inverter 710, the common output line selection switches 703 and 704 are turned off. Thereby, the Cts 211 is connected to the common output line 191, and the Ctn 212 is connected to the common output line 192. Further, at the time of the second operation mode, the mode control signal F1 switches to low level, the common output line selection switches 701 and 702 are turned off, and the common output line selection switches 703 and 704 are turned on. Thereby, the Cts 211 is connected to the common output line 192, and the Ctn 212 is connected to the common output line 191.

As described above, the sampling and holding circuit 160 has the first sampling and holding capacitor 211 and the second sampling and holding capacitor 212. The first common output line 191 and the second common output line 192 are the common output lines for outputting the signals accumulated in the first sampling and holding capacitor 211 and the second sampling and holding capacitor 212 to an outside. In the differential amplifier 171, the first common output line 191 and the second common output line 192 are connected to the input terminal. The common output line switching unit 700 connects the first sampling and holding capacitor 211 to the first common output line 191, and connects the second sampling and holding capacitor 212 to the second common output line 192 in the first operation mode. Further, the common output line switching unit 700 connects the first sampling and holding capacitor 211 to the second common output line 192, and connects the second sampling and holding capacitor 212 to the first common output line 191 in the second operation mode.

In the present embodiment, the common output lines 191 and 192 which are connected to the sampling and holding capacitors 211 and 212 in the sampling and holding circuit 160 are switched according to the operation mode. By causing the polarities of the signal components which are input into the differential amplifier 171 to correspond to each other in the first operation mode and the second operation mode, the differential amplifier 171 can be operated in proper input and output operation ranges.

All of the above described embodiments only show examples of embodying the present invention in carrying out the present invention, and it is to be understood that the technical range of the present invention is not interpreted as restrictive by them. That is to say, the present invention can be carried out in various forms without departing from the technical idea or the main feature of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-243200, filed Sep. 22, 2008, which is hereby incorporated by reference herein in its entirety.

What is claimed is:

1. A solid-state imaging apparatus comprising:
a plurality of pixels arranged linearly along columns of N, wherein N is a positive integer, wherein each of the pixels includes a photoelectric conversion element for converting a light into a charge and accumulating the charge, a reset unit for resetting the charge of the photoelectric conversion element and an amplifying unit for amplifying a signal corresponding to the charge of the photoelectric conversion element;
a plurality of clamping capacitors each arranged corresponding to each column of the pixels, for accumulating the signal amplified by the amplifying unit;
a plurality of common nodes arranged each corresponding to each set including the clamp capacitors of L, wherein L is a positive integer equal to or larger than 2, and a divisor of N, and each connectable to each set including the clamping capacitors of L;
a plurality of selecting switches each arranged between the clamping capacitor and the common node;
a clamping unit for clamping the common nodes to a reference potential; and
a sampling and holding circuit arranged subsequent stage of the common nodes through the clamping unit, and sampling and holding a signal corresponding to a signal of the common node, wherein
the solid-state imaging apparatus performs a first operation mode, such that the clamping capacitor samples, as a light signal, the signal corresponding to the charge of the photoelectric conversion element accumulated, thereafter the clamping capacitor samples, as a reset signal, the signal of the photoelectric conversion element after the reset by the reset unit, and further thereafter, by turning on one of the plurality of selecting switches connected to the same common node, the sampling and holding circuit samples and holds a difference signal between the light signal and the reset signal, and
the solid-state imaging apparatus performs a second operation mode, such that the clamping capacitor samples, as the reset signal, the signal of the photoelectric conversion element reset by the reset unit, thereafter the clamping capacitor samples, as the light signal, the signal corresponding to the charge of the photoelectric conversion element accumulated, and further thereafter, by turning on a plurality of the selecting switches connected to the same common node, the sampling and holding circuit samples and holds a difference signal between the reset signal and the light signal.

2. The solid-state imaging apparatus according to claim 1, further comprising
a reference voltage switching means for switching the reference potential between a first reference potential during the first operation mode and a second reference potential during the second operation mode.

3. The solid-state imaging apparatus according to claim 1, wherein
the sampling and holding circuit includes first and second sampling and holding capacitors, and a sampling and holding capacitor switching unit, and
the sampling and holding capacitor switching unit controls such that the first sampling and holding capacitor accumulates the difference signal between the light signal and the reset signal, and the second sampling and holding capacitor accumulates a noise signal, during the first operation mode, and such that the first sampling and holding capacitor accumulates the noise signal, and the second sampling and holding capacitor accumulates the difference signal between the light signal and the reset signal, during the second operation mode.

4. The solid-state imaging apparatus according to claim 1, wherein
the sampling and holding circuit includes
first and second sampling and holding capacitors,
a first common output line for externally outputting a signal accumulated in the first sampling and holding capacitor,
a second common output line for externally outputting a signal accumulated in the second sampling and holding capacitor,
a differential amplifier having first and second input terminals, and
an input terminal switching unit,
the input terminal switching unit connects the first common output line to the first input terminal of the differential amplifier and connects the second common output line to the second input terminal of the differential amplifier during the first operation mode, and
the input terminal switching unit connects the first common output line to the second input terminal of the differential amplifier and connects the second common output line to the first input terminal of the differential amplifier during the second operation mode.

5. The solid-state imaging apparatus according to claim 1, wherein
the sampling and holding circuit includes
first and second sampling and holding capacitors,
a first common output line for externally outputting a signal accumulated in the first sampling and holding capacitor,
a second common output line for externally outputting a signal accumulated in the second sampling and holding capacitor,
a differential amplifier having input terminals connected to the first and second common output lines, and
a common output line switching unit,
the common output line switching unit connects the first sampling and holding capacitor to the first common output line and connects the second sampling and holding capacitor to the second common output line during the first operation mode, and
the common output line switching unit connects the first sampling and holding capacitor to the second common output line and connects the second sampling and holding capacitor to the first common output line during the second operation mode.

6. A method of driving a solid-state imaging apparatus comprising:
a plurality of pixels arranged linearly along columns of N, wherein N is a positive integer, wherein each of the pixels includes a photoelectric conversion element for converting a light into a charge and accumulating the charge, a reset unit for resetting the charge of the photoelectric conversion element and an amplifying unit for amplifying a signal corresponding to the charge of the photoelectric conversion element;
a plurality of clamping capacitors each arranged corresponding to each column of the pixels, for accumulating the signal amplified by the amplifying unit;
a plurality of common nodes arranged each corresponding to each set including the clamp capacitors of L, wherein L is a positive integer equal to or larger than 2, and a divisor of N, and each connectable to each set including the clamping capacitors of L;
a plurality of selecting switches each arranged between the clamping capacitor and the common node;

a clamping unit for clamping the common nodes to a reference potential; and a sampling and holding circuit arranged subsequent stage of the common nodes through the clamping unit, and sampling and holding a signal corresponding to a signal of the common node, wherein the method includes a first operation mode comprising steps of:

sampling by the clamping capacitor, as a light signal, the signal of the photoelectric conversion element accumulated sampling by the clamping capacitor, as a reset signal, the signal of the photoelectric conversion element after the reset by the reset unit, and turning on one of the plurality of selecting switches connected to the same common node, to sample and hold by the sampling and holding circuit a difference signal between the light signal and the reset signal, wherein the steps are performed in this order; and includes a second operation comprising steps of:

sampling by the clamping capacitor, as the reset signal, the signal of the photoelectric conversion element accumulated;

sampling by the clamping capacitor, as the light signal, the signal of the photoelectric conversion element accumulated, and further thereafter; and turning on a plurality of the selecting switches connected to the same common node, to sample and hold by the sampling and holding circuit a difference signal between the reset signal and the light signal, wherein the steps are performed in this order.

7. The solid-state imaging apparatus according to claim 1, further comprising a timing generator for generating a timing signal, and a mode switching unit for switching, according to a mode control signal, between the first and second operation modes, based on the timing signal, by selectively turning on the selecting switches.

* * * * *